US009038268B2

(12) United States Patent
Yamane et al.

(10) Patent No.: US 9,038,268 B2
(45) Date of Patent: May 26, 2015

(54) INKJET PRINTING HEAD MANUFACTURE METHOD, PRINTING ELEMENT SUBSTRATE, AND INKJET PRINTING HEAD

(75) Inventors: Toru Yamane, Yokohama (JP); Kenji Yabe, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/350,033

(22) Filed: Jan. 13, 2012

(65) Prior Publication Data

US 2012/0206539 A1 Aug. 16, 2012

(30) Foreign Application Priority Data

Feb. 10, 2011 (JP) ................................ 2011-027197
Apr. 18, 2011 (JP) ................................ 2011-091944

(51) Int. Cl.

| | |
|---|---|
| ***B21D 53/76*** | (2006.01) |
| ***B23P 17/00*** | (2006.01) |
| ***B41J 2/135*** | (2006.01) |
| ***B41J 2/14*** | (2006.01) |
| ***B41J 2/16*** | (2006.01) |

(52) U.S. Cl.
CPC ............ *B41J 2/14032* (2013.01); *B41J 2/1628* (2013.01); *B41J 2/1629* (2013.01); *B41J 2/1631* (2013.01); *B41J 2/1645* (2013.01)

(58) Field of Classification Search
CPC ...... B41J 2/1603; B41J 2/1626; B41J 2/1631; B41J 2/1623; B41J 2/14032; B41J 2/1645; B41J 2/1629; B41J 2/1628
USPC .......................................... 29/890.1; 347/44
See application file for complete search history.

(56) References Cited

U.S. PATENT DOCUMENTS

| | | | | |
|---|---|---|---|---|
| 4,638,337 | A * | 1/1987 | Torpey et al. | 347/65 |
| 4,847,630 | A * | 7/1989 | Bhaskar et al. | 347/63 |
| 5,010,355 | A * | 4/1991 | Hawkins et al. | 347/64 |
| 5,229,785 | A * | 7/1993 | Leban | 347/47 |
| 5,412,412 | A * | 5/1995 | Drake et al. | 347/40 |
| 5,450,108 | A * | 9/1995 | Drake et al. | 347/65 |
| 5,534,901 | A * | 7/1996 | Drake | 347/63 |
| 6,063,702 | A * | 5/2000 | Chung | 438/624 |
| 6,592,209 | B2 * | 7/2003 | Miyamoto et al. | 347/63 |
| 2012/0206539 | A1 * | 8/2012 | Yamane et al. | 347/50 |

FOREIGN PATENT DOCUMENTS

| | | | |
|---|---|---|---|
| EP | 0 609 860 | A2 | 8/1994 |
| JP | 06-286149 | A | 10/1994 |
| JP | 7-329307 | A | 12/1995 |
| JP | 11-070658 | A | 3/1999 |

(Continued)

OTHER PUBLICATIONS

Notification of Reasons for Refusal dated Dec. 25, 2012, in Japanese Application No. 2011-091944.

(Continued)

*Primary Examiner* — David Angwin
(74) *Attorney, Agent, or Firm* — Fitzpatrick, Cella, Harper & Scinto

(57) ABSTRACT

A manufacture method can form an inkjet printing head by which a plurality of ejection openings have a uniform shape. Heaters adjacent to one another have thereamong a common conductive line commonly connected to these heaters or a dummy conductive line not involved in the energization of the heaters.

12 Claims, 8 Drawing Sheets

(56) References Cited

FOREIGN PATENT DOCUMENTS

| | | | |
|---|---|---|---|
| JP | 2002-144572 | A | 5/2002 |
| JP | 2009-178906 | A | 8/2009 |

OTHER PUBLICATIONS

Office Action issued in Chinese Application No. 201210029846.9 dated Dec. 30, 2013.

* cited by examiner

INKJET PRINTING HEAD MANUFACTURE METHOD, PRINTING ELEMENT SUBSTRATE, AND INKJET PRINTING HEAD

BACKGROUND OF THE INVENTION

1. Field of the Invention

The present invention relates to a manufacture method of an inkjet printing head, a printing element substrate, and an inkjet printing head by which ink can be ejected.

2. Description of the Related Art

Some inkjet printing heads used in an inkjet printing apparatus use an electrothermal conversion element (heater) for ejecting ink through an ink ejection opening. Such a printing head is configured so that heat generated from the heater can be used to foam ink and the foaming energy thereof can be used to eject ink through the ejection opening.

With an increase of the printing density in recent years, it has been required to arrange a plurality of ejection openings and heaters with a higher density. Japanese Laid-Open Publication No. H11-070658 (1999) suggests a configuration for arranging heaters with a higher density by forming common conductive lines among heaters adjacent to one another so as to reduce the number of the power conductive lines connected to the heaters. A method also has been known to suppress the variation of the volume of ink ejected through an ejection opening by forming a nozzle by a photolithography step on a substrate having thereon a heater. A manufacturing method of a printing head includes the manufacturing method disclosed in Japanese Laid-Open Publication No. H6-286149 (1994). According to the manufacturing method, an ink flow path pattern is formed on a substrate by resin that can be dissolved and the resin is coated with a flow path formation member (covering resin material) including solid epoxy resin at a room temperature. Thereafter, the flow path formation member is exposed and cured to form an ejection opening after which the resin forming the ink flow path pattern is eluted.

FIG. 8 illustrates, as disclosed in Japanese Laid-Open Publication No. H11-070658 (1999), a step in which a flow path formation member 111 made of photosensitive epoxy resin is coated on a printing element substrate 110 to subsequently expose and cure the flow path formation member 111 to form an ejection opening 100. The substrate 110 has thereon a heater 400, an insulating layer 407, an anti-cavitation film 406, and a resin contact layer 405. The substrate 110 also has thereon a common conductive line 401 as disclosed in Japanese Laid-Open Publication No. H11-070658 (1999). The heaters 400 are arranged in the left-and-right direction in FIG. 8. The heaters 400 adjacent to one another have thereamong a part having the common conductive line 401 and a part not having the common conductive line 401. When the flow path formation member 111 is exposed and cured in order to form the ejection opening 100, light is reflected as shown in the arrows in FIG. 8. The arrows A in FIG. 8 show a direction along which ink in an ink flow path 300 is ejected by the heat generated from the heater 400 during the use of the manufactured printing head.

However, when the flow path formation member 111 is exposed and cured as shown in FIG. 8, non-uniform reflected light is caused from a part having the common conductive line 401 among the heaters 400 and a part not having the common conductive line 401 among the heaters 400. Specifically, the existence or nonexistence of the common conductive line 401 at these parts causes different shapes of the insulating layer 407, the anti-cavitation film 406, and the resin contact layer 405. As a result, the reflected lights from these parts have different reflection intensities or reflection angles, which consequently cause a variation in the ejection opening shape of the flow path formation member 111. When the flow path formation member 111 made of photosensitive epoxy resin is subjected to i-ray exposure by an i-ray stepper (i-ray: wavelength 365nm) in particular, there is a risk where the variation in the reflection intensity or the reflection angle of the reflected light may cause the ejection opening 100 to have a distorted shape different from a desired shape. The reason is that the flow path formation member 111 made of epoxy resin is highly influenced by the reflected light because the flow path formation member 111 is photosensitive to i-ray but does not absorb much of i-ray itself.

As described above, the variation in the shape of the ejection opening 100 of the flow path formation member 111 causes a risk of a variation in the ink ejection direction and the ejection amount. This consequently causes a risk where, when such a printing head is used to print an image on a printing medium, the ink landing position on the printing medium is deviated to thereby cause a printed image having a deteriorated quality.

SUMMARY OF THE INVENTION

The present invention provides the manufacture method of an inkjet printing head, a printing element substrate, and an inkjet printing head according to which a plurality of ejection openings have a uniform shape.

In the first aspect of the present invention, there is provided a manufacture method of an inkjet printing head, comprising:

a step of preparing a substrate;

a formation step of forming, on a surface of the substrate, an element array formed by arranging a plurality of electrothermal conversion elements for generating energy to eject, upon energization, ink through corresponding ejection openings, a plurality of common conductive lines arranged in first regions, each of the first regions being positioned between adjacent electrothermal conversion elements, each of common conductive lines being used to energize at least two electrothermal conversion elements, and a plurality of dummy conductive lines arranged in second regions, each of the second regions being positioned between adjacent electrothermal conversion elements that do not have the first region therebetween, the dummy conductive lines not being used to energize the electrothermal conversion elements;

a coating step following the formation step, the coating step coating the surface with a photosensitive material that is cured upon exposure; and an exposure step following the coating step, the exposure step exposing the portions of the photosensitive material corresponding to the plurality of dummy conductive lines and the plurality of common conductive lines except for parts corresponding to the ejection openings.

In the second aspect of the present invention, there is provided a printing element substrate, comprising:

an element array formed by arranging a plurality of electrothermal conversion elements for generating energy to eject, upon energization, ink through corresponding ejection openings;

a plurality of common conductive lines arranged in first regions, each of the first regions being positioned between adjacent electrothermal conversion elements, each of common conductive lines being used to energize at least two electrothermal conversion elements; and a plurality of dummy conductive lines arranged in second regions, each of the second regions being positioned between adjacent electrothermal conversion elements that do not have the first region therebetween, the dummy conductive lines not being used to energize the electrothermal conversion elements.

In the third aspect of the present invention, there is provided an inkjet printing head, comprising:

the above printing element substrate; and a flow path formation member that has the plurality of ejection openings and walls for forming flow paths communicating with the respective ejection openings, the flow path formation member being abutted to the printing element substrate to thereby form the flow paths.

According to the present invention, electrothermal conversion elements adjacent to one another can include thereamong a common conductive line used for the energization of the electrothermal conversion elements or a dummy conductive line not involved in the energization of the electrothermal conversion elements, thereby providing a uniform shape to a plurality of ejection openings. Specifically, the ejection openings can have a uniform shape by suppressing, when the ejection openings are formed by exposing and curing photosensitive resin, reflected light irradiated to the periphery of the ejection openings from having a variation in the reflection intensity or the reflection angle. As a result, a reliable printing head can be manufactured in which ink can be ejected through the ejection openings in uniform direction and amount.

Further features of the present invention will become apparent from the following description of exemplary embodiments (with reference to the attached drawings).

DESCRIPTION OF THE EMBODIMENTS

The following section will describe embodiments of the present invention with reference to the drawings.

(First Embodiment)

Figure 1A:
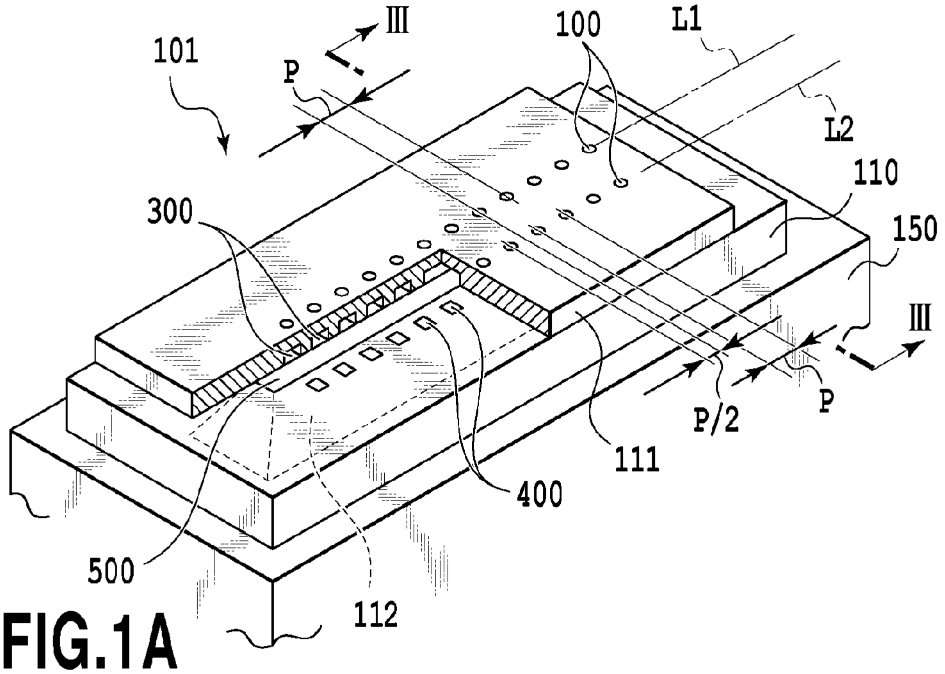
FIG. 1A is a partial cutaway perspective view illustrating the main part of a printing head in the first embodiment of the present invention.

FIG. 1A is a partial cutaway perspective view of an inkjet printing head 101 in this embodiment. The printing element substrate 110 of the printing head 101 of this example has thereon element arrays. These element arrays are arranged by arranging a plurality of electrothermal conversion elements (heaters) 400 that can be energized via a conductive line (which will be described later). The printing element substrate 110 has thereon a flow path formation member (covering resin material) 111. The flow path formation member 111 has a plurality of ejection openings 100 corresponding to the respective heaters 400. The printing element substrate 110 prepared is a semiconductor substrate such as silicon. The heater 400 is formed by material such as tantalum silicon nitride (TaSiN).

In the case of this example, the respective ejection openings 100 are arranged along two ejection opening arrays L1 and L2 with a predetermined pitch P. The ejection opening array L1-side ejection opening 100 and the ejection opening array L2-side ejection opening 100 are dislocated to each other by a half pitch (P/2) in the direction along which these ejection openings 100 are arranged. The plurality of heaters 400 are arranged so as to be opposed to these ejection openings 100 with a substantially-uniform interval as in these ejection openings 100. The printing element substrate 110 has a common liquid chamber 112 and a hole-like ink supply opening 500. The printing element substrate 110 and the flow path formation member 111 have therebetween a plurality of ink flow paths (foaming chambers) 300 communicating with the plurality of ejection openings 100, respectively. The flow path formation member 111 has a wall of the ink flow path 300 and is abutted to the printing element substrate 110 to thereby form the ink flow path 300. Ink supplied from an ink supply member 150 through the common liquid chamber 112 and an ink supply opening 500 is introduced into the respective ink flow paths 300. The ink in the ink flow path 300 is foamed by the heat generated from the heater 400 corresponding to the ink flow path 300 and is ejected by the foaming energy thereof through the ejection opening 100 corresponding to the ink flow path 300.

Figure 1B:
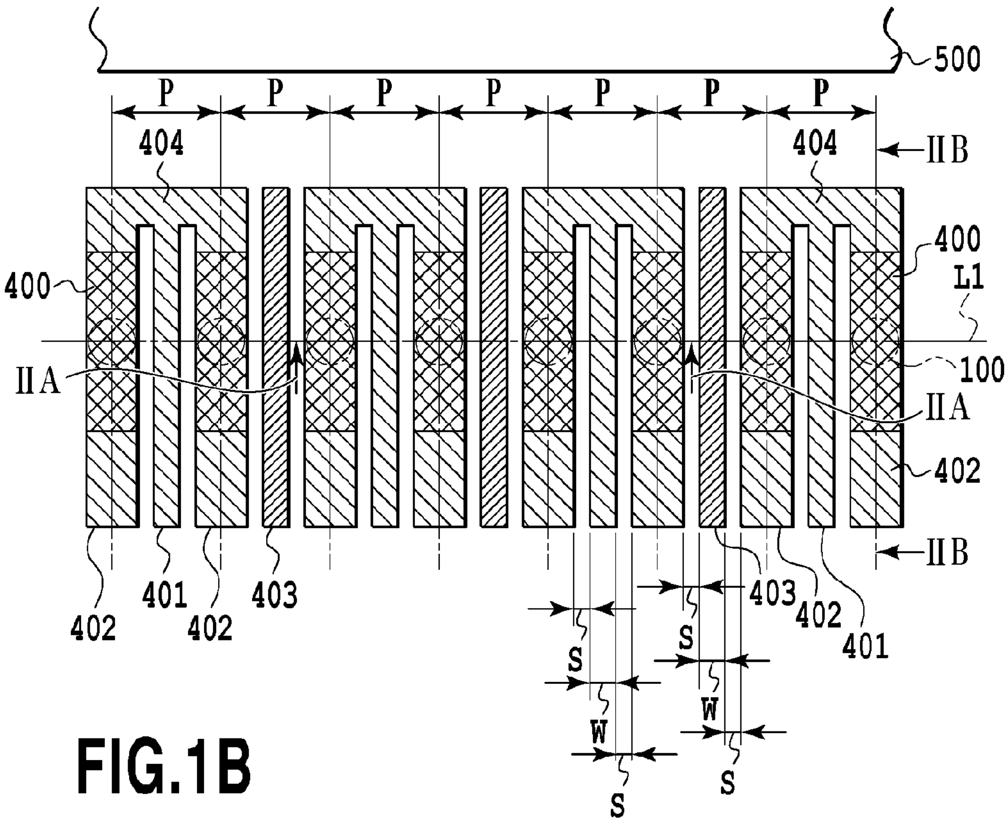
FIG. 1B is an enlarged top view illustrating the substrate in the printing head of FIG. 1A.

FIG. 1B is a top view of the main part of the printing element substrate 110 for explaining the arrangement layout of the heater 400 and the conductive line. In FIG. 1B, the anti-cavitation film 406, the insulating layer 407, and the resin contact layer 405 (which will be described later) formed on the heater 400 and the conductive line are not shown. As in the ejection openings 100 formed in the flow path formation member 111, the heaters 400 are arranged with a predetermined pitch P and are opposed to the corresponding ejection openings 100. The ejection openings 100 are positioned just above the heaters 400. The heater 400 in this example has a substantially-rectangular shape. The heaters 400 are arranged in the length direction of the ink supply opening 500 opened in the surface of the printing element substrate 110 with a fixed pitch P corresponding to the printing density of 1200 dpi. The ejection openings 100 are also formed with a similar arrangement density. The arrangement density thereof also may be equal to or higher than 1200 dpi. First ends of the respective heaters 400 are individually connected to individual conductive lines 402. The other ends of the respective heaters 400 (the ink supply opening 500-side ends) are connected to a connection conductive line 404 so that every two of them are connected to one connection conductive line 404. The connection conductive line 404 is connected to the common conductive line 401 sent between two heaters 400. The common conductive line 401 extends in a direction away from the ink supply opening 500 as in an individual conductive line 402. The common conductive line 401 and the individual conductive line 402 are connected to a driving circuit (not shown). In order to allow the heater 400 to generate heat, driving power is supplied via the common conductive line 401 and the individual conductive line 402 connected to the heater 400. The driving circuit can be formed on the printing element substrate 110 or on a driving circuit substrate connected to the printing element substrate 110.

The printing element substrate 110 also has thereon a dummy conductive line (dummy pattern) 403 not connected to the heater 400. This dummy conductive line 403 is a conductive line not involved in the energization of the heater. The dummy conductive line 403 is not connected to at least one of the end of the heater 400 and the driving signal output section of the driving circuit. The dummy conductive line 403 is positioned between two heaters 400 having thereamong no common conductive line 401. In other words, the heaters 400 adjacent to one another have thereamong a region having the common conductive line 401 and a region having the dummy conductive line 403 instead of the common conductive line 401. The dummy conductive line 403 is desirably formed by the same material as that of the common conductive line 401. The dummy conductive line 403 made by the same material as that of the common conductive line 401 can also provide a uniform reflectivity of the light used for the exposure of the flow path formation member. This dummy conductive line 403 is desirably formed to have the same width W as that of the common conductive line 401. Furthermore, the interval between the dummy conductive line 403 and the heater (the interval between a dummy conductive line and a heater closest to the dummy conductive line) is desirably set to the same interval as the interval S between the heater 400 and the common conductive line 401 (the interval S between a common conductive line and a heater closest to the common conductive line). By providing the same interval between the dummy conductive line 403 and the heater 400 as that between the heater 400 and the common conductive line 401, the heaters 400 adjacent to one another can have thereamong a uniform concavo-convex shape, thus providing a substantially-uniform amount of reflected light reflected at a position having an ejection opening as described later. Furthermore, the common conductive line 401 and the dummy conductive line 403 desirably have the same thickness in a direction vertical to the plane of the printing element substrate 110.

Figure 2A:
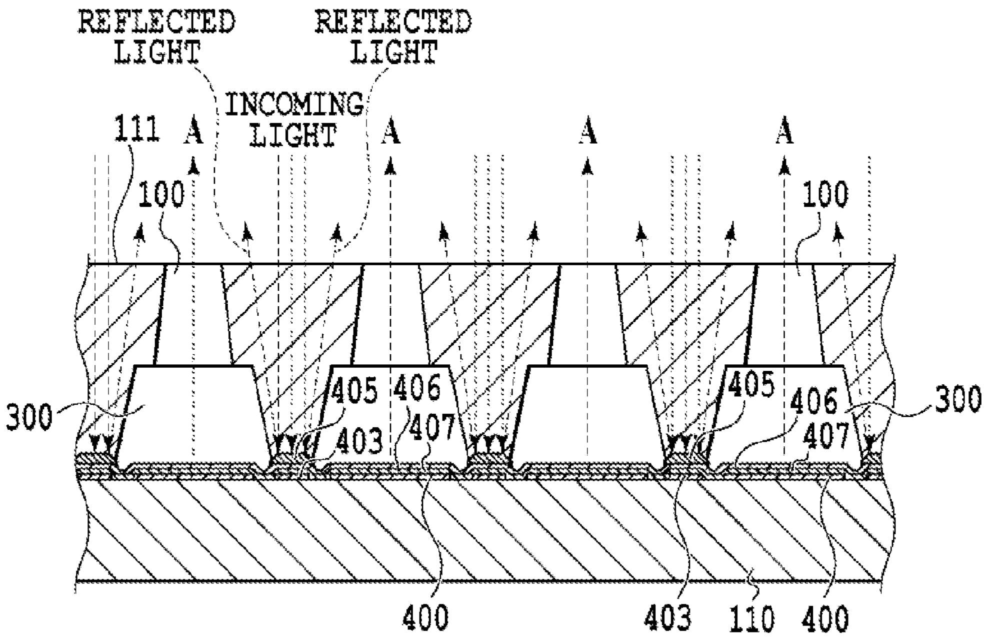
FIG. 2A is a cross-sectional view taken along section line IIA-IIA of FIG. 1B in the manufacture stage of the printing head of FIG. 1A.
Figure 2B:
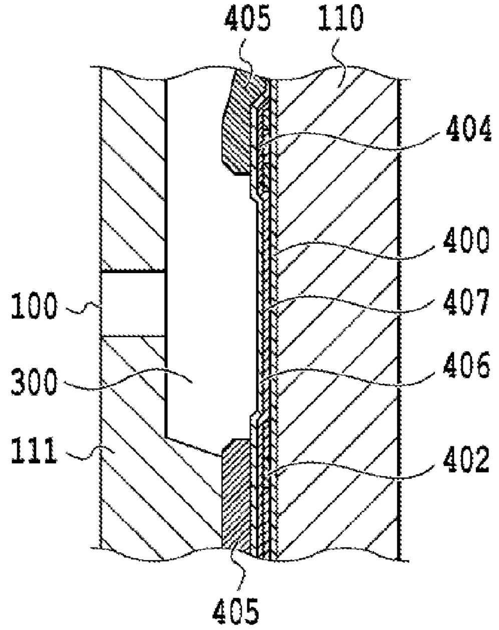
FIG. 2B is a cross-sectional view taken along section line IIB-IIB of FIG. 1B.

FIG. 2A is a cross-sectional view taken along the section line IIA-IIA in FIG. 1B of the printing head 101. FIG. 2B is a cross-sectional view of the main part taken along the section line IIB-IIB in FIG. 1B of the printing head 101.

In the printing element substrate 110, the heater 400 as well as the conductive lines 401, 402, 403, and 404 have thereon the insulating layer 407, the anti-cavitation film 406, and a resin contact layer (contact-improving resin layer) 405. The resin contact layer 405 functions to improve the contact between the substrate 110 and the flow path formation member 111. The resin contact layer 405 has thereon a flow path formation member (photosensitive resin) 111. The flow path formation member 111 is, as described later, formed on removable mold material for forming an ink flow path pattern and the mold material is finally removed. The existence of the dummy conductive line 403 allows the heaters adjacent to one another in the left-and-right direction of FIG. 1B and FIG. 2A to have thereamong the common conductive line 401 or the dummy conductive line 403. As a result, during the exposure and curing of the flow path formation member 111, the reflected light from the printing element substrate 110 is symmetric in the left-and-right direction as shown by the dotted conductive line in FIG. 2A as described later, thus forming the ejection openings 100 accurately.

FIG. 3A to FIG. 5C illustrate the manufacture process of the printing head. FIG. 3A to FIG. 5C are a cross-sectional view illustrating the printing head during the manufacture process of the printing head taken along the conductive line III-III in FIG. 1A. In the case of this example, the printing element substrate 110 is a silicon substrate having the crystal orientation 100.

Figure 3A:
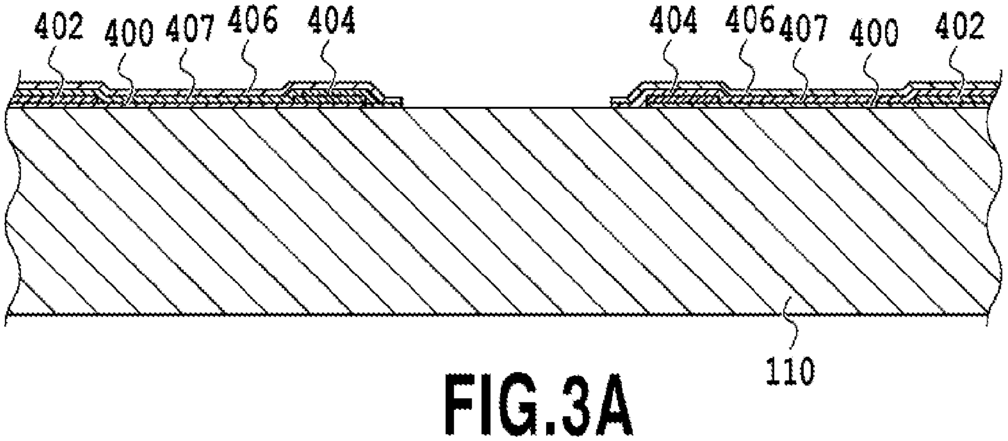
FIG. 3A, FIG. 3B, and FIG. 3C are cross-sectional views illustrating the manufacture steps of the printing head of FIG. 1A, respectively.

As shown in FIG. 3A, the printing element substrate 110 has thereon the heater 400 (e.g., (heat element) as an ejection energy generation element for generating ink ejection energy and the conductive lines 401, 402, 403, and 404 made of a conductive material such as aluminum as described above. These members are obtained by coating a heat generation material generating heat upon energized (e.g., TaSiN) with a conductive material (e.g., aluminum). Thereafter, the heat generation material and the conductive material are partially removed at the same time by an etching technique such as dry etching to thereby form the conductive lines 401, 402, 403, and 404. Then, the conductive material (e.g., aluminum) at the position corresponding to the heater 400 is removed by an etching technique such as wet etching. By applying a potential difference between the conductive line 401 and the conductive line 402 for energization, the heater 400 can generate thermal energy used to eject ink through the corresponding ejection opening. These members have thereon the insulating layer 407 and the anti-cavitation film 406 of a Ta film. The back face of the printing element substrate 110 (the lower face in FIG. 3A) is entirely covered by a SiO2 film (not shown).

Figure 3B:
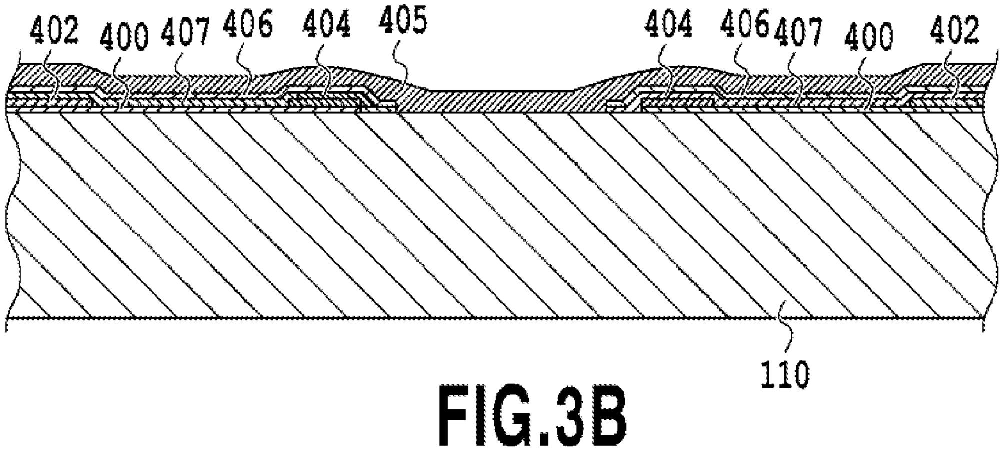
Figure 3C:
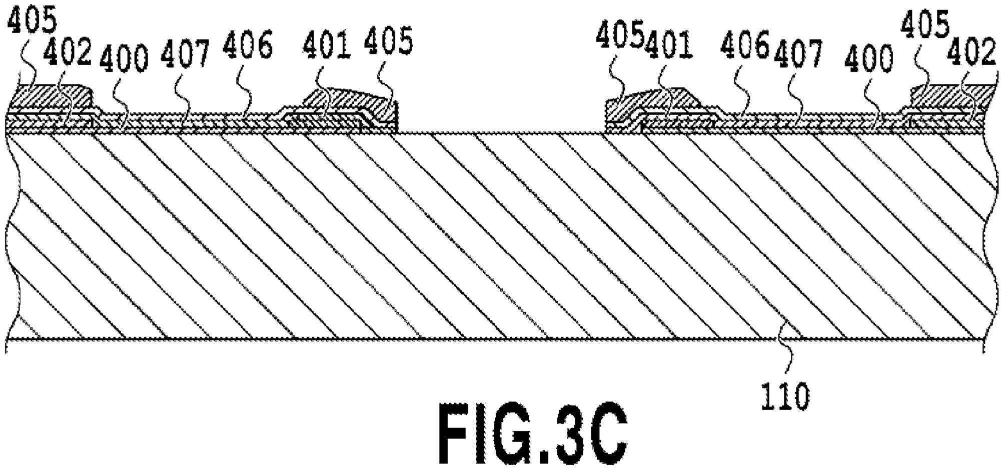

As shown in FIG. 3B, the surface of the printing element substrate 110 as described above is coated with the resin contact layer 405 of polyether amide resin to subsequently cure the resin contact layer 405 by baking. Thereafter, in order to pattern the resin contact layer 405, positive resist is coated by spin coating and exposed and developed to pattern the resin contact layer 405 of polyether amide resin by dry patterning to subsequently peel the positive resist (FIG. 3C).

Figure 4A:
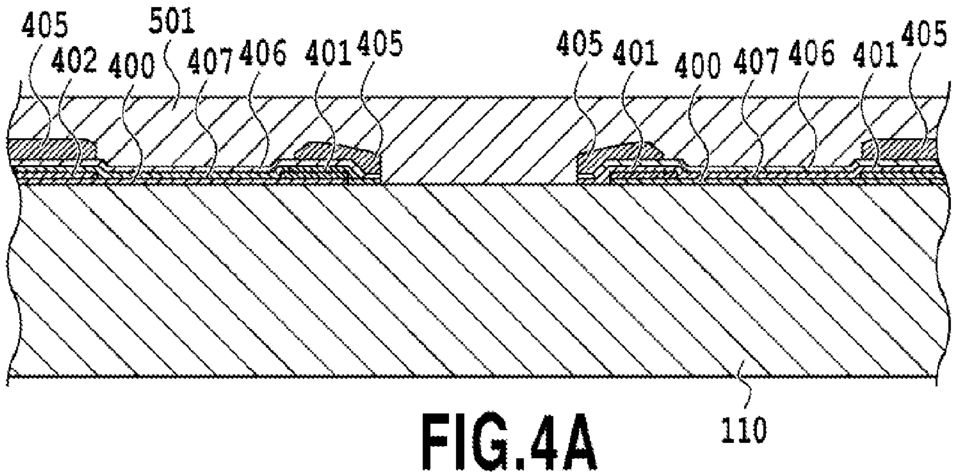
FIG. 4A, FIG. 4B, and FIG. 4C are cross-sectional views illustrating the manufacture steps of the printing head of FIG. 1A, respectively.
Figure 4B:
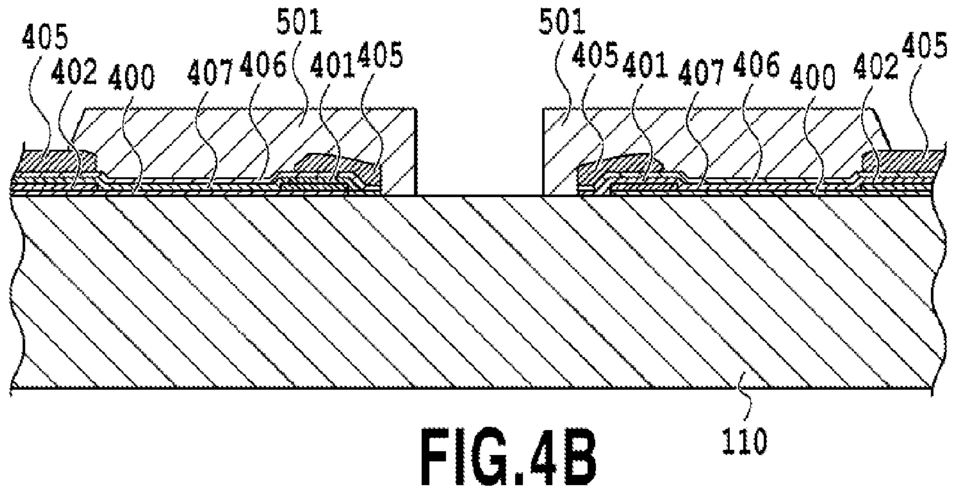
Figure 4C:
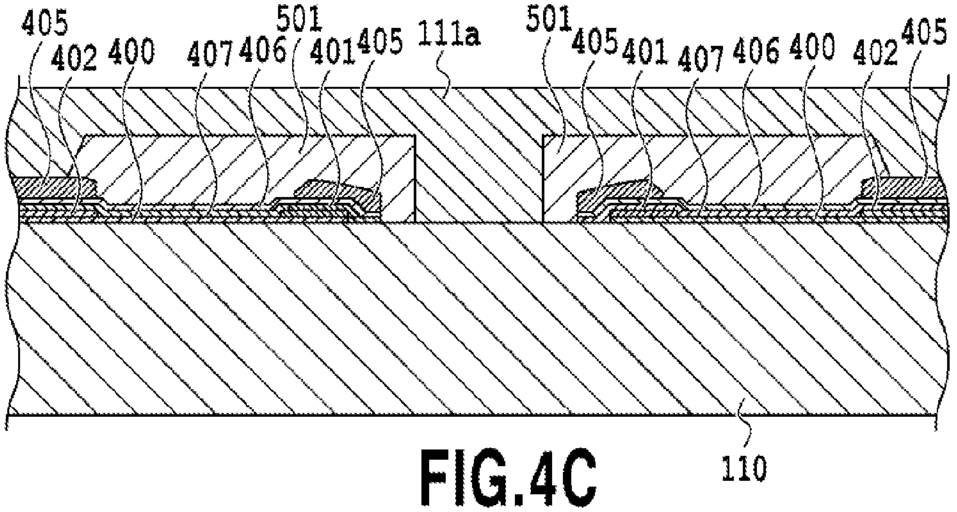

Thereafter, as shown in FIG. 4A, the printing element substrate 110 is coated with a removable mold material (mold material) 501 (positive resist) for forming an ink flow path pattern and then the mold material 501 is patterned (FIG. 4B). Next, as shown in FIG. 4C, a photosensitive material 111*a* for forming the flow path formation member 111 made of photosensitive epoxy resin is formed on the mold material 501 by spin coating for example. The photosensitive material 111*a* has thereon a water repellent material (not shown) formed by laminating a dry film for example.

Figure 5A:
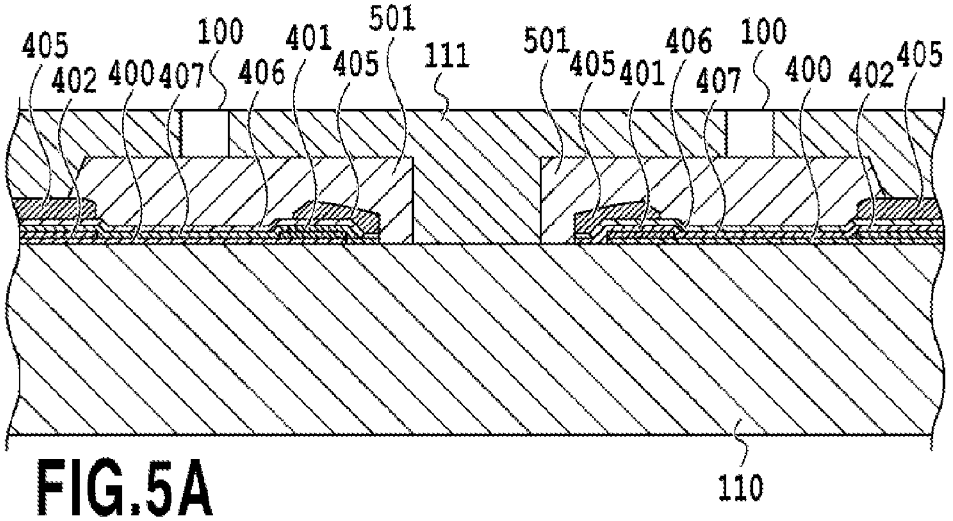
FIG. 5A, FIG. 5B, and FIG. 5C are cross-sectional views illustrating the manufacture steps of the printing head of FIG. 1A, respectively.
Figure 5B:
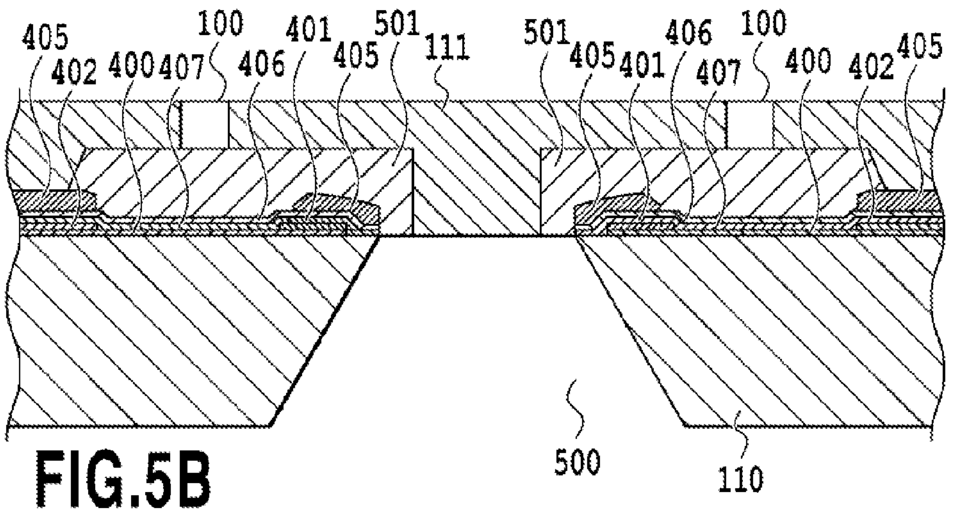
Figure 5C:
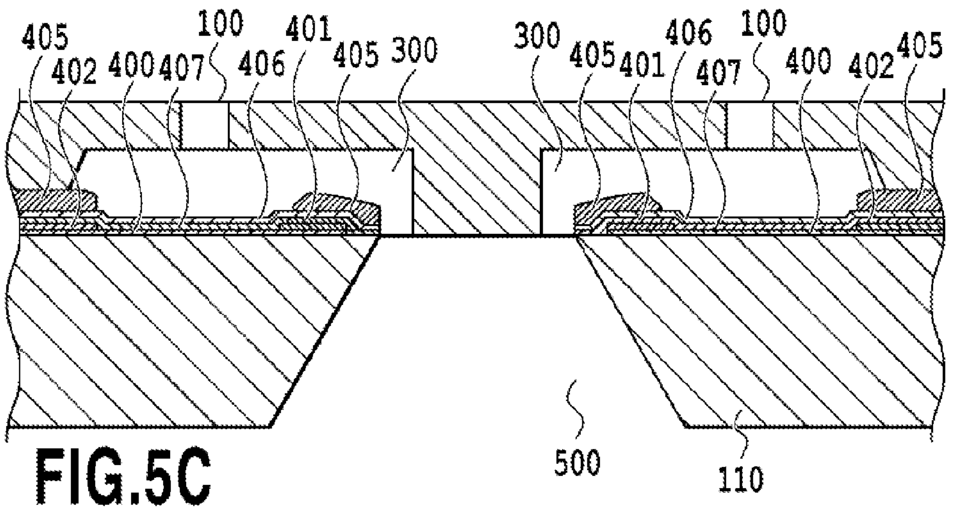

The ejection opening 100 for ejecting ink is formed by exposing the photosensitive material 111*a* and the water repellent material (not shown) to i-ray, ultraviolet rays, or Deep UV light for example (FIG. 5A). During this, a part corresponding to the ejection opening 100 is covered with a mask so that this part is not exposed. Thereafter, the photosensitive material 111*a* at a part corresponding to the ejection opening is removed to thereby complete the ejection opening 100. Next, as shown in FIG. 5B, the ink supply opening 500 is formed on the printing element substrate 110. This ink supply opening 500 is formed by subjecting the printing element substrate 110 made of silicon to a chemical etching (e.g., an anisotropic etching using a strong alkaline solution such as tetramethylammonium hydroxide (TMAH)). Next, as shown in FIG. 5C, the mold material 501 is eluted from the ejection opening 100 and the ink supply opening 500 to thereby form the ink flow path (foaming chamber) 300.

When the flow path formation member 111 is exposed and cured in order to form the ejection opening 100 as shown in FIG. 5A, the reflected light from the printing element substrate 110 is symmetric in the left-and-right direction with regard to the ejection opening 100 as shown by the dotted conductive line in FIG. 2A. The reason is that the heaters 400 adjacent to one another have thereamong the common conductive line 401 or the dummy conductive line 403 as described above. Specifically, parts among the heaters 400 adjacent to one another uniformly have the common conductive line 401 or the dummy conductive line 403. Furthermore, these parts have thereon uniformly-formed concavo-convex parts composed of the insulating layer 407, the anti-cavitation film 406, and the resin contact layer 405, for example. Thus, the respective parts among the heaters 400 adjacent to one another uniformly reflect the incoming light for exposing and curing the flow path formation member 111 as shown in FIG. 2A. These reflected lights have such incoming angle and incoming intensity that are symmetric in the left-and-right direction with regard to one ejection opening 100 in FIG. 2A. As a result, all of the ejection openings 100 can be formed to have uniform shape and size, thus allowing ink to be ejected through these ejection openings in uniform direction and amount. This can consequently suppress, when an image is printed on a printing medium by a printing apparatus using the printing head as described above, the variation in the landing position of ink droplets (position at which ink dots are formed) to thereby print an image of a high quality.

Furthermore, a printing head has been required to meet requirements for a printing apparatus having a higher printing speed and a printed image having a higher quality by arranging many ejection openings 100 with a high density, thus resulting in the ejection opening 100 having a very small size of a few to tens of micrometers. In order to form the ejection opening 100 with a higher accuracy, an i-ray stepper (i-ray: wavelength 365nm) is preferably used. In this case, the flow path formation member 111 made of photosensitive resin is made of such resin material that is photosensitive to i-ray (e.g., epoxy resin).

Resin material such as epoxy resin absorbs substantially no i-ray itself. Thus, light incoming to such resin material is remarkably reflected, as described above, by the concavo-convex shapes of the parts among the heaters 400 adjacent to one other. However, even in the case of such i-ray, the existence of the dummy conductive line can allow the reflected light to have the incoming angle and the incoming intensity that are symmetric in the left-and-right direction with regard to one ejection opening 100, thus consequently forming all of the ejection openings 100 with a high accuracy.

Figure 6A:
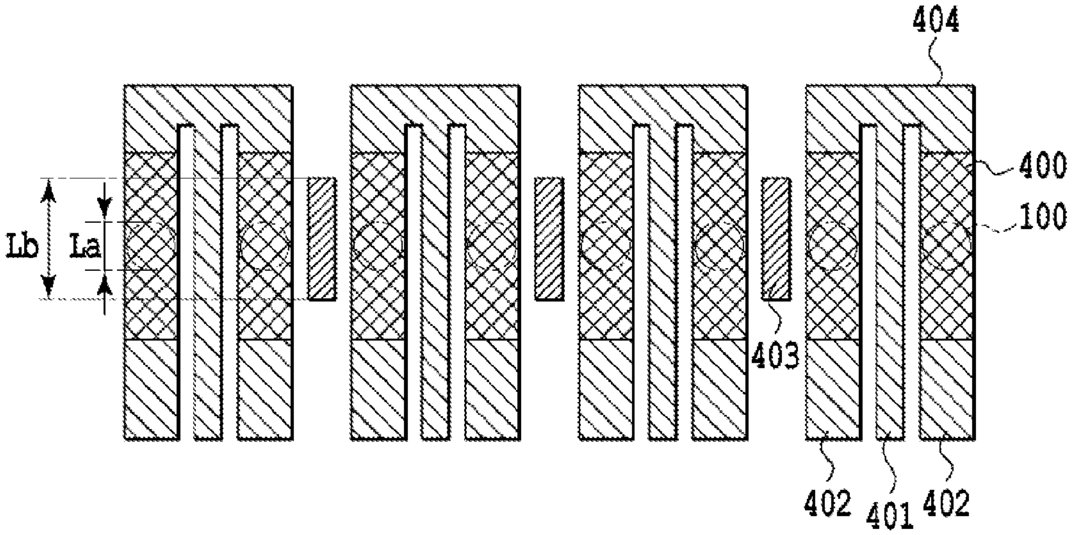
FIG. 6A and FIG. 6B illustrate a different modification example of the printing head of FIG. 1A.
Figure 6B:
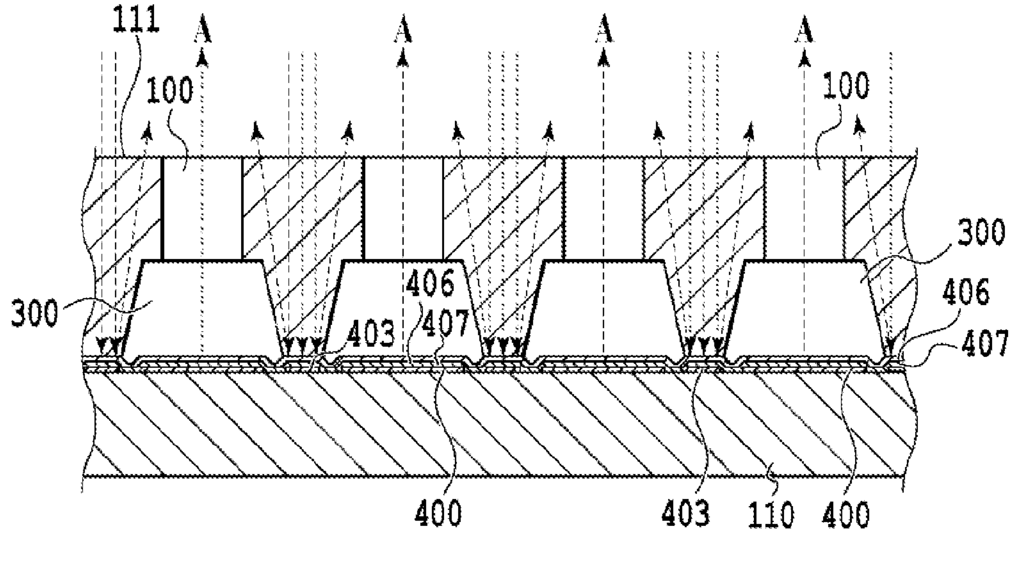

The dummy conductive line 403 is not always required to have a long length as in the common conductive line 401. For example, as shown in FIG. 6A, the dummy conductive line 403 may have the length Lb that is equal to or longer than the length La of the ejection opening 100 in the up-and-down direction in the drawing. Specifically, the dummy conductive lines 403 may be positioned at such a position that is in the direction orthogonal to the direction along which the heaters 400 are arranged and that is out of the range within which the ejection openings 100 are formed. According to the present invention, in a printing head in which the heaters 400 adjacent to one another have therebetween a part having the common conductive line 401 and a part not having the common conductive line 401, the latter part has the dummy conductive line. Thus, the printing head of the present invention does not require the resin contact layer 405 as in FIG. 6B for example. The printing head of the present invention also does not need the anti-cavitation film 406 or the insulating layer 407. Even such a printing head can prevent, if including the dummy conductive line 403, the curing of the flow path formation member 111 for the formation of the ejection opening 100 from causing the variation in the incoming angle or the incoming intensity of the reflected light emitted to the periphery of the ejection opening 100 as described above. As a result, the ejection openings 100 can have a uniform shape to thereby allow ink ejected through the ejection openings 100 in uniform direction and amount.

(Second Embodiment)

Figure 7A:
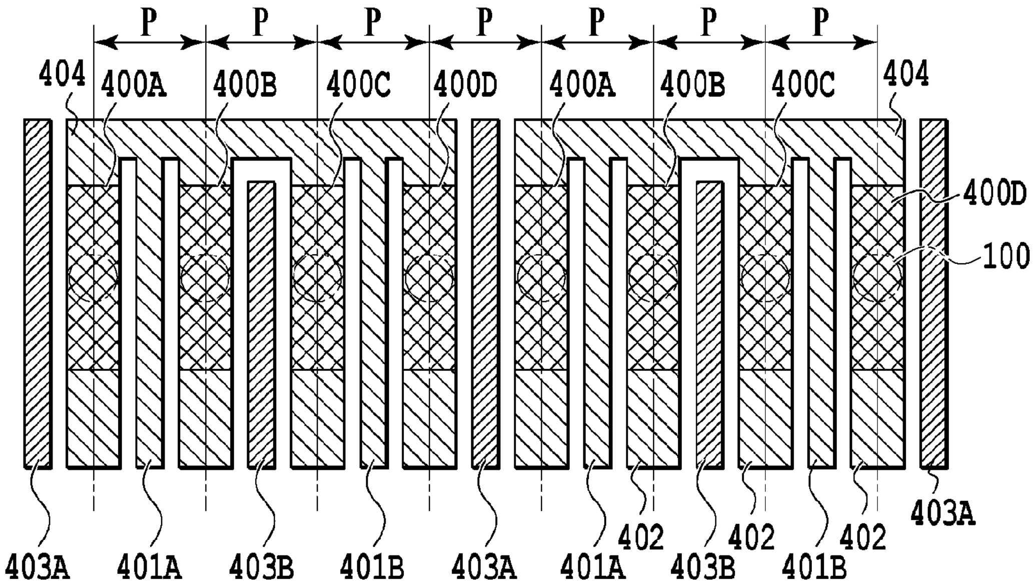
FIG. 7A is an enlarged top view illustrating the substrate of the printing head of the second embodiment of the present invention.

FIG. 7A illustrates the second embodiment of the present invention. In this embodiment, one heater group including four heaters 400A, 400B, 400C, and 400D has two common conductive lines 401A and 401B. The common conductive line 401A is formed between the heaters 400A and 400B. The common conductive line 401B is formed between the heaters 400C and 400D. In this example, the dummy conductive lines 403A and 403B having a different length are formed. The dummy conductive line 403A having a comparatively-long length is positioned between the heater 400A in one group of two heater groups adjacent to each other and the heater 400D in the other side of the other group. The dummy conductive line 403B having a relatively-short length is positioned between the heater 400B and the heater 400C in one heater group. The relation between the number of heaters constituting a heater group and the number of the common conductive lines 401 may be arbitrary. Thus, four heaters may have one or three common conductive lines or three heaters 400 may have one common conductive line,. for example. The important thing is that a dummy conductive line is formed between heaters having therebetween no common conductive line.

(Third Embodiment)

Figure 7B:
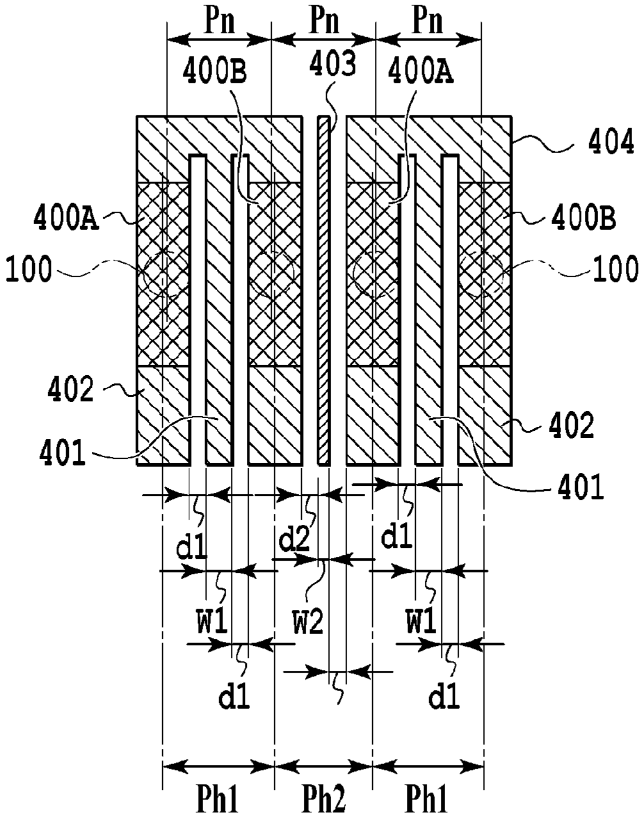
FIG. 7B is an enlarged top view illustrating the substrate of the printing head of the third embodiment of the present invention.
Figure 8:
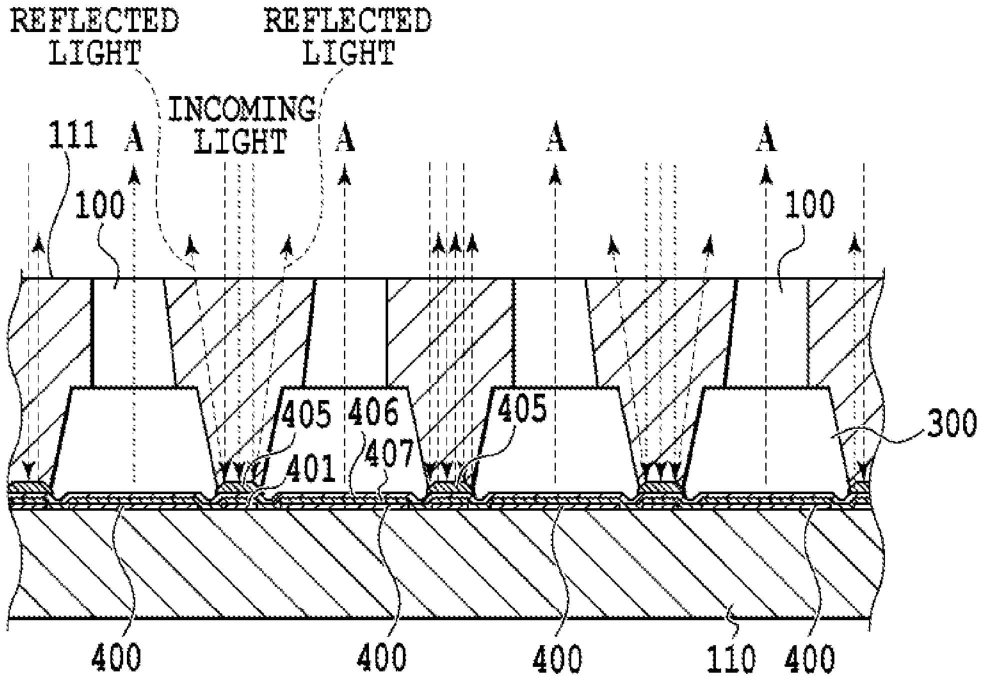
FIG. 8 is a cross-sectional view illustrating the manufacture method of a conventional printing head.

FIG. 7B illustrates the third embodiment of the present invention. In this embodiment, one heater group including two heaters 400A and 400B has one common conductive line 401. The heaters are arranged with a different pitch from that for arranging ejection openings. Specifically, each of the heaters 400A and 400B in one heater group is arranged at the pitch Ph1 that is different from the pitch Ph2 for arranging the heater 400A in one of two heater groups adjacent to each other and the heater 400B in the other heater group. On the other hand, the ejection openings 100 have thereamong a uniform pitch Ph that is different from the pitch Ph1 and the pitch Ph2.

With regard to the ejection openings 100 arranged at a high density, the common conductive line 401 has the conductive line width W1 limited due to the limitation on the current density and distances d1 and d2 (FIG. 7B) are limited due to the limitation on the conductive line process rule. The conductive line width W1 and the distances d1 and d2 must be reduced in order to sufficiently secure the areas of the heaters 400A and 400B. In this embodiment, in view of the situation as described above, the dummy conductive line 403 has the width W2 narrower than the width W1 of the common conductive line 401. In accordance with this, the ejection opening 100 has the fixed pitch Pn while the heaters 400A and 400B are arranged at different pitches Ph1 and Ph2 (Ph1>Ph2). Since the ejection opening 100 has the fixed pitch Pn, the density for arranging the ejection openings (i.e., the density at which ejected ink is generated) is maintained at the fixed value Pn. In the configuration as described above, the distance d1 is equal to the distance d2 (d1=d2) in order to reduce, during the light curing of the flow path formation member 111, the variation in the incoming angle or the incoming intensity of the reflected light emitted to the periphery of the ejection opening 100. The distance d1 is a distance between the heaters 400A and 400B and the common conductive line 401 in one heater group. The distance d2 is a distance between each of the heaters 400A and 400B in the heater groups adjacent to each other and the dummy conductive line 403. The distance dl and the distance d2 provided to be equal to each other can substantially eliminate the variation in the incoming angle or the incoming intensity of the reflected light emitted to the periphery of the ejection opening 100. As described above, the present invention can be applied even to an inkjet printing head in which heaters are arranged with a non-uniform pitch.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2011-027197, filed Feb. 10, 2011 and No. 2011-091944, filed Apr. 18, 2011, which are hereby incorporated by reference herein in its entirety.

What is claimed is:

1. A manufacture method of an inkjet printing head, comprising:

a step of preparing a substrate having a surface on which an element array, a plurality of first conductive lines, and a plurality of second conductive lines are provided, the element array being formed by arranging a plurality of electrothermal conversion elements for generating energy to eject, upon energization, ink through corresponding ejection openings, the plurality of first conductive lines being arranged in first regions, each of the first regions being positioned between adjacent electrothermal conversion elements, each of the first conductive lines being used to energize at least adjacent electrothermal conversion elements which are positioned at both sides of the corresponding first conductive line, and the plurality of second conductive lines being arranged in second regions, each of the second regions being positioned between adjacent electrothermal conversion elements that do not have the first region therebetween, the second conductive lines not being used to energize the electrothermal conversion elements, the plurality of electrothermal conversion elements, the plurality of first conductive lines, and the plurality of second conductive lines having an arrangement order, in an arrangement direction of the element array parallel to the surface of the substrate, of one of the electrothermal conversion elements, one of the first conductive lines, another of the electrothermal conversion elements, and one of the second conductive lines;

a coating step following the preparing step, the coating step coating the surface with a photosensitive material that is cured upon exposure; and an exposure step following the coating step, the exposure step exposing at least portions of the photosensitive material except for masked parts corresponding to the ejection openings, the portions overlapping with the first conductive lines or the second conductive lines in a direction vertical to the surface of the substrate.

2. The manufacture method of the printing head according to claim 1, wherein the exposure step is followed by a step of removing the photosensitive material at the parts corresponding to the ejection openings to thereby form the ejection openings.

3. The manufacture method of the printing head according to claim 1, wherein with regard to the arrangement direction of the element array, a width between each of the first conductive lines and an element of the electrothermal conversion elements closest to the first conductive line is substantially equal to a width between each of the second conductive lines and an element of the electrothermal conversion elements closest to the second conductive line.

4. The manufacture method of the printing head according to claim 1, wherein the plurality of electrothermal conversion elements are arranged at substantially-uniform intervals.

5. The manufacture method of the printing head according to claim 1, wherein the preparing step further includes:

a step of coating the surface with a conductive material; and a step of patterning the conductive material to simultaneously form the plurality of first conductive lines and the plurality of second conductive lines.

6. The manufacture method of the inkjet printing head according to claim 1, wherein the preparing step and the coating step have therebetween a step of forming a resin layer for improving contact between the substrate and the cured photosensitive material.

7. The manufacture method of the printing head according to claim 1, wherein each of the second conductive lines extends over one of the parts corresponding to the ejection openings in a direction crossing to the element array.

8. A manufacture method of an inkjet printing head, comprising:

a step of preparing a substrate having a surface on which a plurality of electrothermal conversion elements for generating energy to eject, upon energization, ink through corresponding ejection openings, a first conductive line, and a second conductive line are provided, the plurality of electrothermal conversion elements including a first electrothermal conversion element, a second electrothermal conversion element, and a third electrothermal conversion element, the first, second, and third electrothermal conversion elements being arranged in the listed order so as to form an element array, the first conductive line being provided between the first electrothermal conversion element and the second electrothermal conversion element and being used to energize the first electrothermal conversion element and the second electrothermal conversion element, the second conductive line being provided between the second electrothermal conversion element and the third electrothermal conversion element and not being used to energize the electrothermal conversion elements, the first and second electrothermal conversion elements and the first and second conductive lines having an arrangement order, in an arrangement direction of the element array parallel to the surface of the substrate, of the first electrothermal conversion element, the first conductive line, the second electrothermal conversion element, and the second conductive line;

a coating step following the preparing step, the coating step coating the surface with a photosensitive material that is cured upon exposure; and an exposure step following the coating step, the exposure step exposing at least portions of the photosensitive material except for masked parts corresponding to the ejection openings, the portions overlapping with the first conductive line or the second conductive line in a direction vertical to the surface of the substrate.

9. The manufacture method of the inkjet printing head according to claim 8, wherein with regard to the arrangement direction of the element array, a width between the first conductive line and the first electrothermal conversion element is substantially equal to a width between the second conductive line and the second electrothermal conversion element.

10. The manufacture method of the inkjet printing head according to claim 8, wherein the plurality of electrothermal conversion elements are arranged at substantially-uniform intervals.

11. The manufacture method of the inkjet printing head according to claim 8, wherein the preparing step further includes:

a step of coating the surface with a conductive material; and a step of patterning the conductive material to simultaneously form the first conductive line and the second conductive line.

12. The manufacture method of the inkjet printing head according to claim 8, wherein the second conductive line extends over one of the parts corresponding to the ejection openings in a direction crossing the element array.

* * * * *